United States Patent [19]

Clope et al.

[11] 4,105,613

[45] Aug. 8, 1978

[54] EPOXY HYDROXOL PRIMER

[75] Inventors: Richard W. Clope, Waukegan; Milton A. Glaser, Glenco, both of Ill.

[73] Assignee: The Dexter Corporation, Windsor Lock, Conn.

[21] Appl. No.: 714,393

[22] Filed: Aug. 16, 1976

[51] Int. Cl.$^2$ .................... C08L 61/24; C08L 63/02
[52] U.S. Cl. ................. 260/29.4 R; 260/834;
427/27; 428/416; 428/417; 428/418; 428/436; 428/460
[58] Field of Search .............................. 428/418, 460; 260/29.4 R, 834, 830 TW, 29.2 EP; 427/27

[56] References Cited

U.S. PATENT DOCUMENTS

| | | | |
|---|---|---|---|
| 2,856,094 | 10/1958 | Gloyer et al. | 220/64 |
| 3,509,086 | 4/1970 | Rohrbacher, Jr. | 260/837 R |
| 3,561,003 | 2/1971 | Lanham et al. | 106/241 |
| 3,666,138 | 5/1972 | Morris, Jr. et al. | 428/418 |
| 3,844,998 | 10/1974 | Jeffery et al. | 260/29.4 R |
| 3,879,324 | 4/1975 | Timmons | 260/29.2 EP |

*Primary Examiner*—Theodore E. Pertilla
*Attorney, Agent, or Firm*—Merriam, Marshall & Bicknell

[57] ABSTRACT

High quality, aqueous-based, heat-curable, primer coating compositions substantially free of organic solvents are disclosed. Said primer compositions include (a) from about 30% to about 75% by weight of a resinous binder which is a mixture of (i) from about 10% to about 60% by weight of finely divided epoxy resin, including blends thereof, having a weight average molecular weight of from about 900 to about 8000 and an epoxide equivalent weight of from about 450 to about 4000, and (ii) from about 5% to about 30% by weight of dispersible, methylated methoxymethyl urea resin which is a crosslinking agent having a formaldehyde:urea molar ratio of 2.2-2.8:1, methanol:urea molar ratio of 1.3-2.0:1, and toluene tolerance of at least 50 weight percent, (b) from about 25% to about 70% by weight of water, and, if desired, (c) up to about 30% by weight of pigment, including a combination of pigments. The pH of the coating compositions should be at least about 9, and the pH control or adjustment may be provided, for example, by a water-soluble amine, such as dimethyl ethanol amine. It is desirable for the compositions to include a surfactant. Said coating compositions are particularly suitable for use as adherent, corrosion resistant primers for metal substrates, such as steel and aluminum.

29 Claims, No Drawings

EPOXY HYDROXOL PRIMER

The present invention relates to a coating composition and particularly to a high quality water-based, corrosion inhibiting primer particularly adapted for use on treated aluminum or treated hot dip galvanized steel.

Primers are used in various industries, such as the building siding industries or in the automotive industry, wherein the primers are generally applied over steel or other metal substrates to form a smooth surface over which various topcoats, such as acrylic lacquers, acrylic dispersion lacquers or acrylic enamel topcoats are applied. In order to produce a product with a smooth topcoat, the primer composition must form an exceptionally smooth substrate over which these topcoat compositions are then applied. Typical primer compositions based on epoxy esters are shown in U.S. Pat. Nos. 3,272,647; 3,505,269; 3,509,086; and 3,844,998. These solvent containing prior art compositions provide high quality finishes and are excellent from a film property point of view. However, there is a great need for finishes which are non-air polluting and in particular there is need of high quality water-based primer compositions that have excellent adhesion to both treated and untreated steel or aluminum substrates, excellent corrosion resistance and provide a surface to which the various paint, lacquer or dispersion topcoats and water-based acrylic topcoats or acrylic powder coated compositions can be applied without the use of intermediate sealer coats.

The primer of the present invention comprises from about 30 to about 75% by weight of a binder dispersed in aqueous medium, which is substantially free of organic solvents. The compositions of the present invention may be applied to steel or aluminum substrates using high speed application techniques such as coil coating, and thereby produce a corrosion resistant product with the topcoat well adhered to the substrate.

The binder resin used to produce the primers of the present invention is generally speaking a mixture of a finely divided epoxy powder or epoxy particles and certain urea formaldehyde resins. While it is presently preferred to employ approximately equal weights of the epoxy resin and the urea formaldehyde resin the relative proportion of these two essential materials may vary over wide limits.

The epoxy resin used in the coating composition of the present invention is a solid epoxy resin preferably having the following structural formula

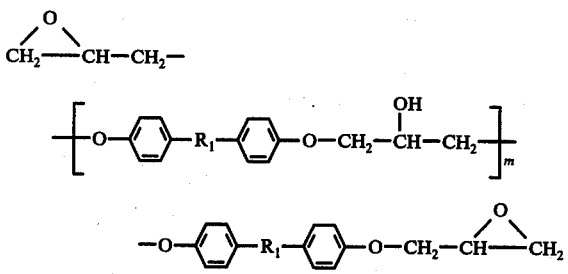

where $R_1$ is an alkylene group of 1-4 carbon atoms and $m$ is a positive integer sufficiently large to provide a weight average molecular weight of about 900-8000 and an epoxide equivalent weight of about 450 to 4000. One of the most preferred epoxy resins is the reaction product of epichlorohydrin and bisphenol A which provides a resin in which $R_1$ is isopropylidene. Another useful epoxy resin is the reaction product of epichlorohydrin and bisphenol F which provides a resin in which $R_1$ is methylene. Blends of various epoxy resins may also be used. Useful epoxy resins are available commercially under the trade designations by Shell as Epon 1001, 1002, 1004, 1007, and 1009, as well as the counterparts of these resins produced by other epoxy suppliers.

It is essential that the epoxy resin used in the present invention be subdivided into small particles and it is deemed essential that the average particle size of the epoxy resin be below certain defined maxima. In the case of epoxy resins which are ground by mechanical means, it is preferred that the resulting powders have an average particle size of 8 microns or less. It has been found that epoxy powders having an average particle size greater than about 15 microns results in a coating which is physically rough. Particles having a size greater than about 25 microns should be completely avoided, if possible. For purposes of the present invention, any epoxy powders having an average particle size greater than about 15 microns are considered to be too coarse to be useful. With respect to epoxy resins that are pre-dispersed in aqueous media, it has been found preferable to have epoxy resin particle sizes in the 1 to 3 micron range, and the coating compositions of the present invention may advantageously use epoxy resins having particles less than 1 micron size. There is no lower limit on the particle size of the epoxy resins used in the present invention other than the limits involved in producing finely divided epoxy resins.

Suitable epoxy resin powder may be prepared by jet milling commercially flaked epoxy resins to produce a powder having a particle size range of 1 to 25 microns with an average particle size in the preferred range of about 8.0 microns or less. Alternatively, pre-dispersed, finely divided epoxy resins in the 1 to 3 micron size range, dispersed in aqueous media, may be employed. Various systems may be used for preparing finely divided epoxy resin, either dry or dispersed. Suitable systems for producing finely divided epoxy resins include spray drying, coagulation-precipitation systems from solvent mixtures and other systems which will be known to those skilled in the art. Such systems are described in the prior art, including U.S. Pat. Nos. 2,297,726; 2,959,561; 3,246,683; 3,306,342; 3,512,570; 3,561,003; and 3,737,401. The last of these patents describes a method of making a powder paint composition, but a similar technique could be used to prepare a powder epoxy resin.

The second essential component of the composition is a water-dispersible urea formaldehyde resin which serves as a crosslinking agent for the epoxy resin. Although various water-dispersible crosslinking agents may be used, such as the partially methylated melamine formaldehyde, butylated melamine formaldehyde, methylated urea formaldehyde and the like, however, for the best properties it is preferred to use methylated methoxymethyl urea resins which are low molecular weight condensation products of urea and formaldehyde having formaldehyde-urea molar ratios of between about 2.2 and 2.8 to 1. These condensates are etherified with methanol to give a methanol-urea molar ratio of between about 1.3 and 2.0 to 1. The preferred materials are more than 50% soluble in water and have a molecular weight low enough to have a toluene tolerance of greater than 50% by weight.

For purposes of the present invention, toluene tolerance is determined by mixing 100 grams of the anhydrous methylated methoxymethyl urea resin with incremental amounts of toluene and if 100 grams of the urea resin will accept 50 grams of toluene without becoming hazy, it will have a toluene tolerance of at least 50%.

In order to produce coating compositions which may be used as primers for water-based topcoats, and achieve the maximum adhesion between the primer and the topcoat, it is essential to use the methylolated urea formaldehyde condensates which have a toluene acceptance of at least 50, as defined above.

As is pointed out above, the polymeric binder, i.e., resin components content of the coating composition comprises from 30 to 75% by weight of the overall composition. The epoxy resin may run from as little as 10% to 60% by weight, while the urea formaldehyde resin may run from about 5% to about 30% by weight of the overall composition. While equal quantities of the epoxy resin and the urea formaldehyde resin are generally preferred, as much as 5 parts of epoxy resin for each part of urea formaldehyde resin may be used. Preferably, the composition also contains a small amount of dimethyl ethanol amine or a similar amine in order to adjust the pH to more than about 9.

If desired the coating composition may be pigmented and may contain surfactants, defoamers, and flow control additives.

In order to prepare a coating composition wherein the resin dispersion has the maximum stability, it is desirable to raise the pH of the dispersion by the addition of a water-soluble amine. Particularly in the case of pigmented systems, it is preferred to raise the pH of the dispersion to above about 9 and most preferably between about 10 and 11 using a water-soluble amine. It has been found that the elevated pH is advantageous in that the surfactants used in the composition are more effective at the elevated pH.

Typical water soluble amines that can be used to raise the pH are primary amines, secondary amines, tertiary amines, polyamines, hydroxyamines and the like such as ethanol amine, diethanol amine, triethanol amine or the like. It is preferred to use dimethyl ethanol amine at about 1.5%, which has been found to be satisfactory to raise the pH to above 10.

Pigments can be used in the novel primer composition of this invention in the amounts of 0.1-30% by weight, and preferably, about 10-25% by weight of pigment is used. Preferably, the pigment is formed into a mill base using conventional techniques and then blended with the composition. Examples of the great variety of pigments which are used in the novel primer composition of this invention are metallic oxides, such as titanium dioxide, iron oxide, and the like, metal hydroxides, chromates, such as lead chromate, sulfides, sulfates, silicates such as calcium silicate, magnesium silicate, aluminum silicate, carbonates, carbon black, silica, talc, china clay, oganic reds, organic maroons, and other organic dyes and lakes.

The novel primer compositions of this invention can be applied to a variety of substrates, for example, treated and untreated autobody steel substrates, unprimed or primed metal substrates, glass, phenolic type plastics, and the like, by any of the usual application methods, such as spraying, electrostatic spraying, dipping, brushing, flow coating and the like. These coatings are best cured by heating the substrates to a peak temperature of about 435°-450° F, followed by quenching. Various acids or amine salts of various strong acids may be used to catalyze the cure and produce cured compositions at temperatures as low as 350° F. Temperatures of 480° F or higher may be used to cure the compositions if desired. The resulting coating is about 0.1-3 mils thick, preferably 0.1-1 mils thick and can be buffed or sanded in accordance with conventional techniques, if desired, to improve smoothness.

In particular, the novel primer composition of this invention has excellent adhesion to bare or treated metals such as hot dip galvanized steel or aluminum used in the fabrication of building panels or residential siding. Also, in addition to its use as a sealerless primer the novel composition can be a highly pigmented coating or can be used as a clear sealer coating. When used as a primer or a primer composition, topcoats of many types of lacquers and enamels have excellent adherence to the novel coating composition of this invention which provides a finish that has a good appearance and has excellent mar, chip, scratch and corrosion resistance.

The following examples serve to illustrate the preferred primer of the present invention, but it is understood that these examples are set forth merely for illustrative purposes and that many other combinations are within the scope of the present invention.

EXAMPLE 1

| The following materials were mixed together: | | |
|---|---|---|
| Resimene X-980 | 303.7 | grams |
| Water | 249.9 | grams |
| Dimethylethanolamine | 2.7 | grams |
| A premix containing | | |
| Tamol 731 (surfactant) | 9 | grams |
| Triton CF-10 (surfactant) | 1.5 | grams |
| Water | 4.5 | grams |
| A premix containing | | |
| Surfynol 104 (surfactant) | 12.3 | grams |
| DMEA dimethylethanol amine | 12.3 | grams |
| Titanium dioxide | 490.2 | grams |
| Strontium chromate | 145.7 | grams |
| Nopco NXZ (defoamer) | 0.8 | grams |
| TOTAL | 1,232.6 | grams |

The Resimene X-980 is a product of Monsanto which is essentially an anhydrous, methylated methoxy(methyl)urea resin, having a formaldehyde-urea molar ratio of 2.2-2.8:1 and a combined methanol-urea molar ratio of from 1.3-2.0 to 1 and has a Gardener-Holdt viscosity of U-Y. The material is more than 50% water soluble, has a toluene tolerance in excess of 50% and an ASTM solvent tolerance of 5 minimum.

The foregoing materials were sand milled to disperse the pigments and wet the pigments with the resinous components.

After the foregoing materials have been properly dispersed, the following premix is added:

| Water | 1217 grams |
|---|---|
| Resimene X-980 | 304 grams |
| Epoxy resin | 609 grams |

The epoxy resin was sold under the trade name Araldite 6097, a conventional bisphenol-A epichlorohydrin polymer having an epoxide equivalent weight of 2000-2500, which had been jet milled to an average particle size of about 8 microns. It was substantially free of particles larger than 25 microns.

The coating composition described in Example 1 had a pH of 10.2. The composition at 50% solids had a Ford

4 viscosity of 18 seconds, weighed 10.00 pounds/gallon, and when cured showed a 60° gloss of 3 and a pencil hardness of 2H.

The coating composition of Example 1 was applied to both hot dip galvanized steel and treated aluminum using conventional coil coating techniques and equipment, to give films 0.2 mils thick. After application, the coil was cured by heating the metal to a temperature of 435°–450° F. after which it was quenched. The primer described in Example 1 was then coated with an acrylic latex, thermosetting topcoat. The resulting substrate passed salt spray tests which would not be passed without the primer.

EXAMPLE 2

Following the procedure of Example 1, the following materials were mixed together and sand milled to disperse the pigments and wet the pigments with the resinous components:

| | | |
|---|---:|---|
| Resimene X-980 | 211.3 | grams |
| Water | 86.95 | grams |
| Dimethylethanolamine | 0.94 | grams |
| A premix of: | | |
| Tamol 731 | 3.05 | grams |
| Triton CF-10 | 0.49 | grams |
| Water | 1.67 | grams |
| A premix of: | | |
| Surfynol 104 | 4.27 | grams |
| Dimethylethanolamine | 4.27 | grams |
| Titanium dioxide | 170.56 | grams |
| Strontium chromate | 50.70 | grams |
| Nopco NXZ | 0.28 | grams |

After the pigments had become dispersed and wetted with the resinous components, the volatile materials were added, with good agitation.

| | | |
|---|---:|---|
| A premix of: | | |
| Tamol 731 | 8.73 | grams |
| Triton CF-10 | 1.46 | grams |
| Water | 4.37 | grams |
| Dimethylethanolamine | 5.87 | grams |
| Dow Chemical XD-8040 | 399.05 | grams |
| A premix of: | | |
| 3M Co. FC-430 (surfactant) | 0.85 | grams |
| Water | 7.61 | grams |
| Water | 155.63 | grams |
| TOTAL | 1118.06 | grams |

The Dow Chemical XD-8040 is a solid bisphenol A-epichlorohydrin type epoxy resin having an average particle size of about 2 microns, and is predispersed in an aqueous media. It contains both epoxy and hydroxyl functionalities with an epoxide equivalent weight of about 1800, and is dispersed in water at 55% solids, giving a kinematic viscosity of 100 CPS. The solid epoxy analog is known as DER-667.

The coating composition of Example 2 was applied to both hot dip galvanized steel and treated aluminum using conventional coil coating techniques and equipment to give film 0.2 mils thick. The film was cured by heating a metal to a temperature of 435°–450° F. after which it was quenched. The primer was coated with acrylic latex, thermosetting topcoat and the resulting substrate passed all spray tests which could not be passed without the primer.

The coating composition described in Example 2 had a pH of 10.0, and when dispersed at 53% solids had a Zahn #4 viscosity of 25 seconds and a weight per gallon of 10.55 pounds. When cured it had a 60° gloss of 10 and a pencil hardness of 2H.

EXAMPLE 3

Following the procedure of Example 1, the following materials were mixed together and sand milled to disperse the pigments and wet the pigments with the resinous components:

| | | |
|---|---:|---|
| Resimene X-975 | 48.72 | grams |
| Water | 128.21 | grams |
| Dimethylethanolamine | 0.86 | grams |
| A premix of: | | |
| Tamol 731 | 2.89 | grams |
| Triton CF-10 | 0.49 | grams |
| Water | 1.44 | grams |
| A premix of: | | |
| Surfynol 104 | 3.94 | grams |
| Dimethylethanolamine | 3.94 | grams |
| Titanium dioxide | 157.12 | grams |
| Strontium chromate | 46.70 | grams |
| Nopco NXZ | 0.26 | grams |

The Resimene X-975 is similar to the X-980 used in Examples 1 and 2, except the X-975 has a higher viscosity (Gardner-Holdt of $Z_2$–$Z_5$) and an ASTM solvent tolerance of 2.0–5.0.

After the pigments had become dispersed and wetted with the resinous components, the volatile materials were added, with good agitation.

| | | |
|---|---:|---|
| A premix of: | | |
| Resimene X-975 | 68.10 | grams |
| Tamol 731 | 30.18 | grams |
| Triton CF-10 | 5.03 | grams |
| Water | 15.09 | grams |
| Dimethylethanolamine | 5.04 | grams |
| Dow Chemical XD-8040 | 514.60 | grams |
| A premix of: | | |
| 3M Co. FC-430 (surfactant) | 0.78 | grams |
| Water | 7.02 | grams |
| Water | 143.40 | grams |
| Propylene glycol | 30.90 | grams |
| TOTAL | 1215.06 | grams |

The coating composition of Example 3 was applied to both hot dip galvanized steel and treated aluminum using conventional coil coating techniques and equipment to give film 0.2 mils thick. The film was cured by heating a metal to a temperature of 435°–450° F. after which it was quenched. The primer was coated with acrylic latex, thermosetting topcoat and the resulting passed all spray tests which could not be passed without the primer.

The coating composition described in Example 3 had a pH of 10.5, and when dispersed at 50% solids was a viscous paste having a weight per gallon of 10.09 pounds. When cured it had a 60° gloss of 11 and a pencil hardness of 2H.

As was mentioned above, the epoxy resin used in the present invention may be pre-dispersed in water or as is shown in Example 1 the powder form of resin may be used. In either event, it is considered essential to use a resin which is substantially free of particles greater than about 15 microns and which is free of particles greater than 25 microns.

The forms of invention herein shown and described are to be considered only as illustrative. It will be apparent to those skilled in the art that numerous modifications may be made therein without departure from the spirit of the invention or the scope of the appended claims.

We claim:

1. An aqueous-based, heat-curable primer coating composition suitable for metal and the like, having a pH of at least about 9, and being substantially free of organic solvents, which comprises:
(a) from about 30% to about 75% by weight of a binder resin which is a mixture of (i) from about 10% to about 60% by weight of finely divided epoxy resin having an average particle size of less than about 15 microns, and (ii) from about 5% to about 30% by weight of dispersible, methylated methoxymethyl urea resin,
said epoxy resin being of the structural formula

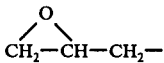

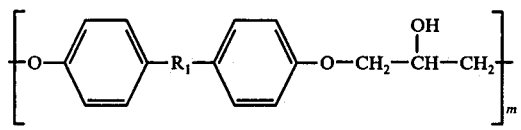

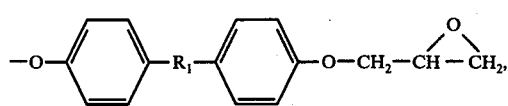

wherein $R_1$ is an alkylene group of 1-4 carbon atoms and $m$ is a positive integer sufficient to provide a weight average molecular weight of from about 900 to about 8000 and epoxide equivalent weight of from about 450 to about 4000,
said methylated methoxymethyl urea resin being a crosslinking agent and having a formaldehyde:urea molar ratio of 2.2-2.8:1 and a methanol:urea molar ratio of 1.3-2.0:1 and a toluene tolerance of a least 50%; and,
(b) from about 25% to about 70% by weight of water.

2. The aqueous-based, heat-curable, primer coating composition of claim 1, wherein $R_1$ of the epoxy resin structural formula is isopropylidene.

3. The aqueous-based, heat-curable, primer coating composition of claim 1, wherein said composition includes up to about 30% by weight of pigment.

4. The aqueous-based, heat-curable, primer coating composition of claim 3, wherein said composition includes from about 10% to about 25% by weight of pigment.

5. The aqueous-based, heat-curable, primer coating composition of claim 1, wherein the pH thereof is from about 10 to about 11.

6. The aqueous-based, heat-curable, primer coating composition of claim 1, wherein said composition includes a water-soluble amine.

7. The aqueous-based, heat-curable, primer coating composition of claim 6, wherein said water-soluble amine is dimethyl ethanol amine.

8. The aqueous-based, heat-curable, primer coating composition of claim 1, wherein said epoxy resin is of reduced size to provide an average particle size of about 8 microns or less.

9. The aqueous-based, heat-curable, primer coating composition of claim 1, wherein said epoxy resin is dispersed in aqueous media and has an average particle size of from about 1 to about 3 microns.

10. The aqueous-based, heat-curable, primer coating composition of claim 1, wherein said composition includes a surfactant.

11. The aqueous-based, heat-curable, primer coating composition of claim 1, wherein said composition includes a surfactant and a water-soluble amine.

12. The aqueous-based, heat-curable, primer coating composition of claim 1, wherein said composition includes a water-soluble amine, a surfactant, and up to about 30% by weight of pigment.

13. An aqueous-based, heat-curable, primer coating composition suitable for metal and the like, and being substantially free of organic solvents, which comprises:
(a) approximately equal parts by weight of (i) finely divided epoxy resin having an average particle size of less than about 15 microns, and (ii) methylated methoxymethyl urea resin,
said epoxy resin being of the structural formula

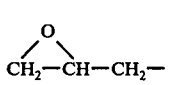

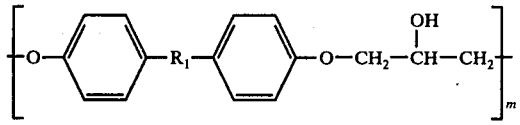

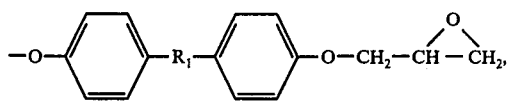

wherein $R_1$ is an alkylene group of 1-4 carbon atoms and $m$ is a positive integer sufficient to provide a weight average molecular weight of from about 900 to about 8000 and epoxide equivalent weight of from about 450 to about 4000,
said methylated methoxymethyl urea resin having a formaldehyde:urea molar ratio of 2.2-2.8:1 and a methanol: urea molar ratio of 1.3-2.0:1 and a toluene tolerance of at least 50%;
(b) a water-soluble amine;
(c) a surfactant; and,
(d) from about 25% to about 70% by weight of water.

14. The aqueous-based, heat-curable, primer coating composition of claim 13, wherein $R_1$ of the epoxy resin structural formula is isopropylidene.

15. The aqueous-based, heat-curable, primer coating composition of claim 13, wherein said composition includes up to about 30% by weight of pigment.

16. The aqueous-based, heat-curable, primer coating composition of claim 13, wherein said composition includes from about 10% to about 25% by weight of pigment.

17. The aqueous-based, heat-curable, primer coating composition of claim 13, wherein the pH thereof is at least about 9.

18. The aqueous-based, heat-curable, primer coating composition of claim 13, wherein the pH thereof is from about 10 to about 11.

19. The aqueous-based, heat-curable, primer coating composition of claim 13, wherein said water-soluble amine is dimethyl ethanol amine.

20. The aqueous-based, heat-curable, primer coating composition of claim 13, wherein said epoxy resin is of reduced size to provide an average particle size of about 8 microns or less.

21. The aqueous-based, heat-curable, primer coating composition of claim 13, wherein said epoxy resin is dispersed in aqueous media and has an average particle size of from about 1 to about 3 microns.

22. An aqueous-based, heat-curable, primer coating composition suitable for metal and the like, and being substantially free of organic solvents, which comprises:
(a) from about 30% to about 75% by weight of a dispersible binder resin which is a mixture of (i) from about 10% to about 60% by weight of finely divided epoxy resin having an average particle size of less than about 15 microns, and (ii) from about 5% to about 30% by weight of dispersible, cross-linking, methylated methoxymethyl urea resin,
said epoxy resin being of the structural formula

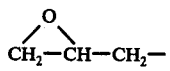

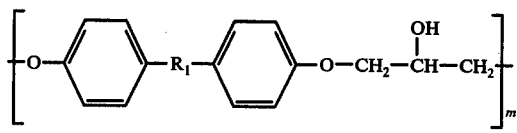

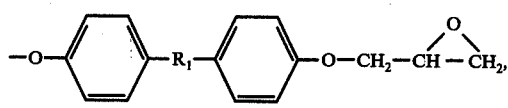

wherein $R_1$ is an alkylene group of 1–4 carbon atoms and $m$ is a positive integer sufficient to provide a weight average molecular weight of from about 900 to about 8000 and epoxide equivalent weight of from about 450 to about 4000,
said methylated methoxymethyl urea resin having a formaldehyde:urea molar ratio of 2.2–2.8:1 and a methanol:urea molar ratio of 1.3–2.0:1 and a toluene tolerance of at least 50%;
(b) a water-soluble amine;
(c) a surfactant;
(d) up to about 30% by weight of pigment; and,
(e) from about 25% to about 70% by weight of water.

23. The aqueous-based, heat-curable, primer coating composition of claim 22, wherein $R_1$ of the epoxy resin structural formula is isopropylidene.

24. The aqueous-based, heat-curable, primer coating composition of claim 22, wherein said water-soluble amine is dimethyl ethanol amine.

25. The aqueous-based, heat-curable, primer coating composition of claim 22, wherein the pH thereof is at least about 9.

26. The aqueous-based, heat-curable primer coating composition of claim 25, wherein the pH thereof is from about 10 to about 11.

27. The aqueous-based, heat curable, primer coating composition of claim 1, wherein said composition cures when heated to temperatures at least 350° F.

28. The aqueous-based, heat curable, primer coating composition of claim 13, wherein said composition cures when heated to temperatures at least 350° F.

29. The aqueous-based, heat-curable, primer coating composition of claim 22, wherein said composition cures when heated to temperatures at least 350° F.

* * * * *